UNITED STATES PATENT OFFICE.

CLARENCE E. FULTON, OF TARENTUM, PENNSYLVANIA, ASSIGNOR TO PITTSBURGH PLATE GLASS COMPANY, A CORPORATION OF PENNSYLVANIA.

MANUFACTURE OF EARTHENWARE.

1,398,014.   Specification of Letters Patent.   Patented Nov. 22, 1921.

No Drawing.   Application filed June 7, 1919. Serial No. 302,472.

*To all whom it may concern:*

Be it known that I, CLARENCE E. FULTON, a citizen of the United States, and a resident of Tarentum, in the county of Allegheny and State of Pennsylvania, have made a new and useful Invention in the Manufacture of Earthenware, of which the following is a specification.

The invention relates to an improvement in the manufacture of earthenware such as clay pots or the like. It has for its primary object the provision of deflocculating agents whereby a maximum degree of fluidity may be secured in the clay body material with a minimum amount of moisture.

It has been proposed to make clay pots or blocks for use in the melting of glass and other clay articles by the use of a pouring operation in which the clay mixture is made sufficiently thin or fluid to flow into molds; but this method has presented difficulties because of the amount of water required to secure the necessary degree of fluidity in the clay mixture. A high degree of moisture increases the time necessary to dry the pots or articles, causes increased shrinkage during the drying operation, and adversely affects the quality of the product by weakening it and increasing its tendency to crack.

The present invention is designed to avoid these difficulties due to too great amount of water in the clay mixture, and the result is secured by the use of deflocculating agents whereby the clay is given the requisite degree of fluidity to permit it to be readily poured into molds without the addition of water to such an extent as will adversely affect the drying of the articles or the uniformity of distribution of the plastic and non-plastic ingredients. As a matter of fact the amount of water used in the clay in the practice of the invention may be reduced to such an extent that glass pots for use in the manufacture of various glasses can be dried in about three-fourths the time required in the case of pots made heretofore by hand in the usual way. The pots produced by the practice of the invention are at least equally as durable as those produced by the old hand process and the glass produced in pots made in accordance with the invention is somewhat better than that produced in the old type pots.

In carrying out the process a plurality of deflocculating agents are preferably employed to increase the fluidity of the clay. One of these is commercial gallic acid. Other agents such as tannic acid having a similar modifying effect upon clay may be used although the gallic acid is preferred.

Another of the modifying agents preferably used is caustic soda (sodium hydroxid). In place of this agent it is possible to use other alkaline hydroxids such as lithium, hydroxid or barium hydroxid. The caustic soda is preferred, however, because of its availability and cheapness.

A third modifying agent, which is used to advantage is some form of soluble alkaline silicate such as sodium silicate, or potassium silicate, or sodium potassium silicate, the first mentioned silicate, of about 40° B solution, being preferred.

The ingredients are preferably used in the following proportions:

|  | Pounds. |
|---|---|
| Clay | 100 |
| Gallic acid | .02 |
| Caustic soda | .02 |
| Sodium silicate | .0224 |

Such a mixture requires the addition of only about 15% of water to make the clay mixture sufficiently plastic to flow readily from the agitator into the pot molds employed. This is only about one-third the amount of water which would be required if the deflocculating agents were not employed. It will be understood that the proportions as above set forth are capable of considerable variation, and the percentages stated are merely a specific example with a particular kind of clay.

Either the caustic soda or the sodium silicate may be used alone with the gallic acid, but in that case the amount of water required to make the clay fluid is greater and the clay does not set as readily. The use of the sodium silicate with the gallic acid gives better results than the use of the caustic with the gallic acid. In such case the proportions used are preferably as follows:

|  | Pounds. |
|---|---|
| Clay | 100 |
| Gallic acid | .02 |
| Sodium silicate | .0224 |

Such mixture can be made sufficiently fluid for pouring with about 17% of water.

When caustic soda is used alone with clay, the proportions are preferably .02 pound of soda to 100 of clay and in this case about 24% of water is required to give the necessary fluidity.

The preferred mixture is the first stated, including both the caustic soda and sodium silicate with the gallic acid, as this combination gives a product which requires the least water, sets the most rapidly, and produces the best article for use in contact with molten glass, to which purpose the invention is particularly directed.

In preparing the clay, it is first thoroughly mixed with a part of the water required in an agitator or mill and toward the conclusion of the operation the gallic acid, soda and silicate in solution are added. The mixture is then run into the molds for producing articles of the desired shape, and after the clay has set, the molds are removed and the articles are permitted to dry thoroughly in the usual way before firing.

What I claim is:

1. An improvement in the manufacture of earthenware which consists in treating a clay body material with an alkaline hydroxid, a soluble alkaline silicate, and a deflocculating agent having the modifying effect in clay characteristic of gallic acid.

2. An improvement in the manufacture of earthenware which consists in treating a clay body material with an alkaline hydroxid, a soluble alkaline silicate and gallic acid.

3. An improvement in the manufacture of earthenware which consists in treating a clay body material with caustic soda, sodium silicate and gallic acid.

4. An improvement in the manufacture of earthenware which consists in treating a clay body material with a soluble alkaline silicate and a deflocculating agent having the modifying effect in clay characteristic of gallic acid.

In testimony whereof, I have hereunto subscribed my name this 6th day of June, 1919.

CLARENCE E. FULTON.